(12) United States Patent
Kim et al.

(10) Patent No.: US 7,712,011 B2
(45) Date of Patent: May 4, 2010

(54) APPARATUS AND METHOD FOR RECEIVING DIGITAL TELEVISION SIGNAL WITH BACKWARD COMPATIBILITY BYTE

(75) Inventors: Sung-Hoon Kim, Daejeon (KR); Kum-Ran Ji, Jeollanam-do (KR); Jae-Young Lee, Seoul (KR); Seung-Won Kim, Daejeon (KR); Soo-In Lee, Daejeon (KR); Chieteuk Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 480 days.

(21) Appl. No.: 10/594,466

(22) PCT Filed: Apr. 1, 2005

(86) PCT No.: PCT/KR2005/000965

§ 371 (c)(1),
(2), (4) Date: Sep. 27, 2006

(87) PCT Pub. No.: WO2006/004302

PCT Pub. Date: Jan. 12, 2006

(65) Prior Publication Data

US 2007/0208987 A1  Sep. 6, 2007

(30) Foreign Application Priority Data

Apr. 1, 2004 (KR) ............ 10-2004-0022643
Aug. 16, 2004 (KR) ............ 10-2004-0064329

(51) Int. Cl.
  *H03M 13/00* (2006.01)
(52) U.S. Cl. .................. 714/784; 375/341
(58) Field of Classification Search ............... 714/784; 375/219, 262, 341
See application file for complete search history.

(56) References Cited

U.S. PATENT DOCUMENTS

| 7,194,047 B2 * | 3/2007 | Strolle et al. | 375/341 |
| 7,197,685 B2 * | 3/2007 | Limberg | 714/756 |
| 2002/0194570 A1 * | 12/2002 | Birru et al. | 714/792 |
| 2005/0271158 A1 * | 12/2005 | Birru | 375/270 |

FOREIGN PATENT DOCUMENTS

| WO | WO02/080559 | 10/2002 |
| WO | WO02/100026 | 12/2002 |
| WO | WO03/003747 | 1/2003 |
| WO | 1020040063779 | 7/2004 |

* cited by examiner

*Primary Examiner*—Sam Rizk
(74) *Attorney, Agent, or Firm*—Ladas & Parry LLP

(57) ABSTRACT

Provided are a Vestigial Side Band (VSB) digital television (DTV) receiver based on is A/53 of the Advanced Television System Committee (ATSC) that can secure backward compatibility of a low-ranked DTV receiver by using parity bytes added to robust data for error correction and obtain RS coding gain from the robust data, and a method thereof. The DTV receiver includes: a receiving unit for receiving a transmission signal including general data and robust data and converting the transmission signal into a base-band signal; an equalizer for determining a symbol level of the transmission signal; a trellis decoder for performing trellis decoding on a symbol of the determined level; a nonsystematic Reed Solomon (NRS) decoder for performing NRS decoding on the trellis-decoded robust data and correcting an error; and a restoring unit for restoring a digital video data stream with respect to the trellis-decoded general data and the NRS-decoded robust data.

7 Claims, 2 Drawing Sheets

APPARATUS AND METHOD FOR RECEIVING DIGITAL TELEVISION SIGNAL WITH BACKWARD COMPATIBILITY BYTE

CROSS-REFERENCES TO RELATED PATENT APPLICATIONS

The present application claims priority under 35 U.S.C. 119(a) to Korean application number 10-2004-0022643, filed on Apr. 1, 2004, and Korean application number 10-2004-0064329, filed on Aug. 16,2004, in the Korean Patent Office, both of which are incorporated herein by reference in their entirety as if set forth in full.

TECHNICAL FIELD

The present invention relates to a Vestigial Side Band (VSB) digital television (DTV) receiver based on a DTV Standard, which is A/53 of the Advanced Television System Committee (ATSC), and a method thereof.

BACKGROUND ART

The standard of the Advanced Television System Committee (ATSC) suggests to use a signal obtained by modulating 12 independent data streams, which are trellis encoded and time-multiplexed, into 10.76 MHz-rate 8-level Vestigial Side Band (VSB) to transmit High Definition Television (HDTV) broadcasting through a terrestrial broadcasting channel. The frequency band of the signal is transformed into a frequency band of 6 MHz which corresponds to a standard Very High Frequency (VHF) or Ultrahigh Frequency (UHF) terrestrial television channel. Signals of the corresponding channel are broadcasted at a data rate of 19.39 Mbps per second. Detailed technology on the ATSC DTV standards and A/53 are readily available through the ATSC.

However, transmission signals of a conventional 8-VSB transceiver are distorted in indoor and mobile channel environments due to variable channel and multipath phenomena, and this degrades reception performance of the receiver.

In other words, transmitted data are affected by various channel distortion factors. The channel distortion factors include a multipath phenomenon, frequency offset, phase jitter and the like. To compensate for the signal distortion caused by the channel distortion factors, a training data sequence is transmitted every 24.2 ms, but a change in multipath characteristics and Doppler interference exist even in the time interval of 24.2 ms that the training data sequences are transmitted. Since an equalizer of the receiver does not have a convergence speed fast enough to compensate for the distortion of receiving signals, which occurs by the change in multipath characteristics and the Doppler interference, the receiver cannot perform equalization precisely.

For this reason, the broadcasting program reception performance of 8-VSB DTV broadcast is lower than that of an analog broadcast and reception is impossible in a mobile receiver. Even if reception is possible, there is a problem that a signal-to-noise ratio (SNR) satisfying Threshold of Visibility (TOV) increases.

In order to resolve the above problem, a dual stream transmission method where a DTV transmission signal is transmitted by separating general data and robust data is discussed recently. In other words, researchers seek to improve the performance of a DTV receiver by adding robust data which are less sensitive to external interruption to general data and transmitting the robust and general data together.

FIG. 1 is a block diagram showing a conventional DTV transmitter. As shown, the transmitter 100 includes: a first multiplexer 101, a data randomizer 103, a Reed Solomon (RS) encoder 105, a robust interleaver/packet formatter 107, a data interleaver 109, a robust encoder 111, a robust data processor 113, a trellis encoder 115, a second multiplexer 117, and a pilot adder/modulator/Radio Frequency (RF) converter 119.

The first multiplexer 101 multiplexes, a general data packet 121 and a robust data packet 123.

The general data packet 121 and the robust data packet 123 are serial data streams formed of 188-byte Moving Picture Experts Group (MPEG) compatible data packets, and they are inputted into and randomized in the randomizer 103 and 20-byte parity information is added thereto for Forward Error Correction (FEC) in the RS encoder 105.

Subsequently, the robust interleaver/packet formatter 107 performs interleaving on the robust data and secures space for inserting a robust data header and a parity bit.

The packet-formatted robust data and the RS-encoded general data are interleaved in the data interleaver 109 and inputted into the robust encoder 111.

The robust encoder 111 and the trellis encoder 115 maps the inputted general and robust data to any one symbol level among $\{-7,-5,-3,-1,1,3,5,7\}$.

Meanwhile, the robust data processor 113 adds 20 parity bytes by performing RS encoding on the packet-formatted robust data to maintain low-rank compatibility with a conventional DTV receiver that does not support robust data.

The trellis-encoded general and robust data are combined with segment synchronization and field synchronization bit sequences from a synchronization unit (not shown) in the second multiplexer 117 to thereby generate a transmission data frame. Subsequently, a pilot signal is added thereto in a pilot adder. A symbol stream is modulated into VSB-suppressed carrier wave in a VSB modulator. A base-band 8-VSB symbol stream is finally converted into an RF signal in an RF converter.

The DTV receiver restores an MPEG data stream by carrying out a process reverse to the process of the transmitter on the transmitted signal.

A receiver that supports only general data can maintain backward compatibility by processing inputted robust data as null packets.

Also, a receiver capable of robust data can improve performance in receiving general and robust data entirely by raising a convergence speed of an equalizer and improving the performance of a trellis decoder.

As described above, fine reception performance can be expected even in a poor transmission environment by mixing general data with robust data and transmitting them in the form of dual stream.

However, the above-described DTV transmission system uses the parity bytes, which are obtained by performing RS coding on robust data and added, only for the backward compatibility of a low-ranked receiver and it does not use them for the purpose of error correction.

If the parity bytes added to the robust data can be used for the error correction, the robust data reception performance can be improved further.

Disclosure

Technical Problem

It is, therefore, an object of the present invention to provide a Digital Television (DTV) receiver that can secure backward compatibility of a low-ranked DTV receiver by using parity bytes added to robust data for error correction and obtain RS coding gain from the robust data, and a method thereof.

The other objects and advantages of the present invention can be understood by those of ordinary skill in the art from the drawings, detailed description, and claims of the present specification.

Technical Solution

In accordance with one aspect of the present invention, there is provided a Digital Television (DTV) receiver includes: a receiving unit for receiving a transmission signal including general data and robust data and converting the transmission signal into a base-band signal; an equalizer for determining a symbol level of the transmission signal; a trellis decoder for performing trellis decoding on a symbol of the determined level; a nonsystematic Reed Solomon (NRS) decoder for performing NRS decoding on the trellis-decoded robust data and correcting an error; and a restoring unit for restoring a digital video data stream with respect to the trellis-decoded general data and the NRS-decoded robust data.

In accordance with one aspect of the present invention, there is provided a DTV receiving method, which includes the steps of: a) receiving a transmission signal including general data and robust data and converting the transmission signal into a base-band signal; b) determining a symbol level of the transmission signal; c) performing trellis decoding on a symbol of the determined level; d) performing nonsystematic Reed Solomon (NRS) decoding on the trellis-decoded robust data and correcting an error; and e) restoring a digital video data stream with respect to the trellis-decoded general data and the NRS-decoded robust data.

The following description exemplifies only the principles of the present invention. Even if they are not described or illustrated clearly in the present specification, one of ordinary skill in the art can embody the principles of the present invention and invent various apparatuses within the concept and scope of the present invention.

The use of the conditional terms and embodiments presented in the present specification are intended only to make the concept of the present invention understood, and they are not limited to the embodiments and conditions mentioned in the specification.

In addition, all the detailed description on the principles, viewpoints and embodiments and particular embodiments of the present invention should be understood to include structural and functional equivalents to them. The equivalents include not only currently known equivalents but also those to be developed in future, that is, all devices invented to perform the same function, regardless of their structures.

For example, block diagrams of the present invention should be understood to show a conceptual viewpoint of an exemplary circuit that embodies the principles of the present invention. Similarly, all the flowcharts, state conversion diagrams, pseudo codes and the like can be expressed substantially in a computer-readable media, and whether or not a computer or a processor is described distinctively, they should be understood to express various processes operated by a computer or a processor.

Functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared.

The apparent use of a term, 'processor', 'control' or similar concept, should not be understood to exclusively refer to a piece of hardware capable of running software, but should be understood to include a digital signal processor (DSP), hardware, and ROM, RAM and non-volatile memory for storing software, implicatively. Other known and commonly used hardware may be included therein, too.

Similarly, a switch described in the drawings may be presented conceptually only. The function of the switch should be understood to be performed manually or by controlling a program logic or a dedicated logic or by interaction of the dedicated logic. A particular technology can be selected for deeper understanding of the present specification by a designer.

In the claims of the present specification, an element expressed as a means for performing a function described in the detailed description is intended to include all methods for performing the function including all formats of software, such as combinations of circuits for performing the intended function, firmware/microcode and the like.

To perform the intended function, the element is cooperated with a proper circuit for performing the software. The present invention defined by claims includes diverse means for performing particular functions, and the means are connected with each other in a method requested in the claims. Therefore, any means that can provide the function should be understood to be an equivalent to what is figured out from the present specification.

Advantageous Effects

The present invention can improve robust data reception performance by using parity bytes of robust data, which are used to secure backward compatibility, for the purpose of error correction in a Digital Television (DTV) transmission system based on dual stream including general data and robust data.

DESCRIPTION OF DRAWINGS

The above and other objects and features of the present invention will become apparent from the following description of the preferred embodiments given in conjunction with the accompanying drawings, in which.

BEST MODE FOR THE INVENTION

Other objects and aspects of the invention will become apparent from the following description of the embodiments with reference to the accompanying drawings, which is set forth hereinafter. If it is considered that further description on the prior art may blur the points of the present invention, the description will not be provided. Hereinafter, preferred embodiments of the present invention will be described in detail with reference to the accompanying drawings.

Figure 1:
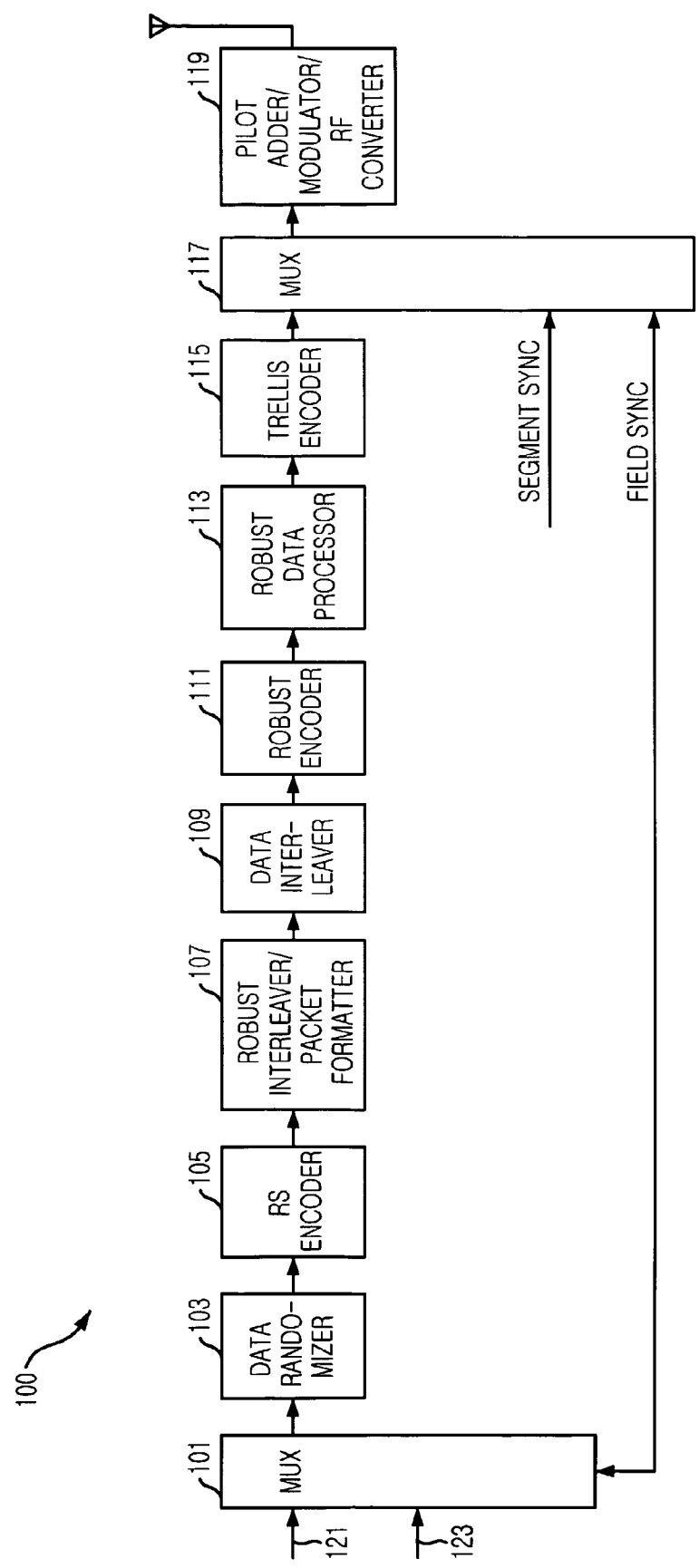
FIG. 1 is a block diagram illustrating a conventional Digital Television (DTV) transmitter.
Figure 2:
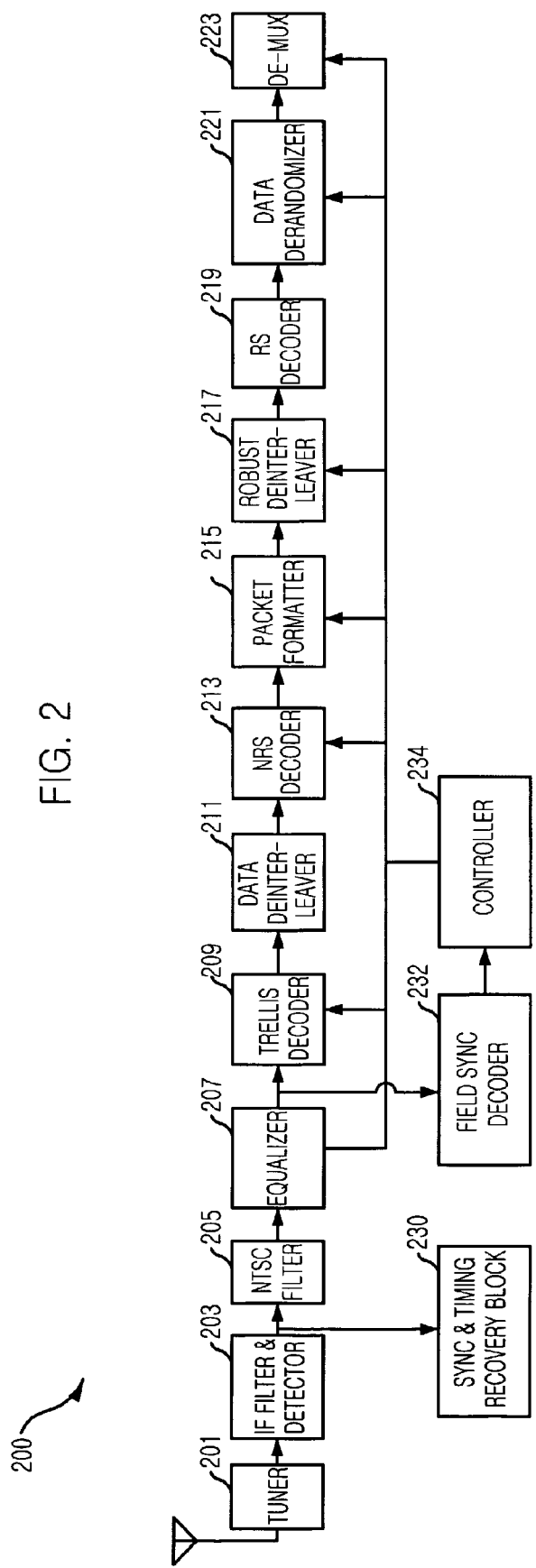
FIG. 2 is a block diagram describing a DTV receiver in accordance with a preferred embodiment of the present invention.

FIG. 2 is a block diagram describing a DTV receiver in accordance with a preferred embodiment of the present invention.

As shown, the DTV receiver 200 includes a tuner 201, an IF filter and detector 203, an NTSC filter 205, an equalizer 207, a trellis decoder 209, a data deinterleaver 211, a Nonsystematic Reed Solomon (NRS) decoder 213, a packet formatter 215, a robust deinterleaver 217, an RS decoder 219, a data derandomizer 221, a demultiplexer 223, a synchronous and timing recovery block 230, a field synchronous decoder 232, and a controller 234.

In particular, the DTV receiver of the present invention includes the NRS decoder 213 for performing robust data error correction on trellis-decoded input data between the data deinterleaver 211 and the packet formatter 215.

First, a channel for the RF signal transmitted from the transmitter 100 is selected in the tuner 201 of the receiver 200. Then, the RF signal goes through intermediate frequency (IF) filtering in an IF filter and detector 203 and a synchronous frequency is detected. A synchronous and timing recovery block 230 detects a synchronous signal and recovers a clock signal.

Subsequently, the signal is removed of a National Television Systems Committee (NTSC) interference signal through a comb filter in the NTSC filter 205, and equalized in the equalizer 207.

For the equalizer 207, a known determiner, which is known as a slicer, or a trellis decoder with a trace back of zero (0) can be used.

The equalizer 207 equalizes a received signal based on a robust data flag obtained from the bit-based data interleaving and the trellis interleaving based on the ATSC A/53 and transmitted from the controller 1725.

The field synchronous decoder 232 receives a segment of a data frame, restores robust data packet restoring information in a reserved area, which includes information on the rate of robust data and general data within a field, and information on the coding rate of the robust data, and transmits it to the controller 234.

The controller 234 computes delay between robust data and general data based on the robust data packet restoring information and transmits the delay information to an element in need of the delay information.

Meanwhile, the data symbol removed of the multi-path interference in the equalizer 207 goes through trellis decoding in the trellis decoder 209.

The decoded data symbol is deinterleaved in the data deinterleaver 211 and RS-decoded in the RS decoder 219.

Herein, the robust data additionally go through an NRS decoding process after the data deinterleaving. That is, the NRS decoder 213 corrects transmission error by performing the NRS decoding before it removes parity bytes added to the robust data in the packet formatter 215.

As described above, RS coding gain can be acquired by using the parity bytes, which are added to the robust data to secure the backward compatibility of a low-ranked receiver during a transmission process, for the purpose of error correction. In accordance with the present embodiment, an error can be corrected up to 10 bytes per 207-byte robust data packet in a conventional channel environment.

The packet formatter 215 can remove a packet header and the parity bytes from the NRS-decoded robust data and reconstruct robust data which are extended into two packets into one packet.

The robust data reconstructed in the packet formatter are deinterleaved in the robust deinterleaver 217 and RS-decoded together with general data.

The controller computes delay time caused by the NRS decoding, the packet formatting and the deinterleaving, which are carried out only on robust data, and transmits the delay time information to the data derandomizer 221.

The data derandomizer 221 derandomizes the general data and the robust data based on the transmitted delay time. For example, when the $n^{th}$ general data packet is derandomized, the next robust data packet to be derandomized may not be the $(n+1)^{th}$ robust data packet transmitted from the transmitter but it may be the $k^{th}$ robust data packet where k<n. A robust data packet is delayed behind a general data packet due to delay in restoration into the original packet in the packet formatter 215. Therefore, the data derandomizer 221 should perform the derandomization in consideration of the delay.

The demultiplexer 223 demultiplexes general and robust data packets based on the robust data flag to thereby output a serial data stream formed of 188-byte MPEG compatible data packets.

While the present invention has been described with respect to certain preferred embodiments, it will be apparent to those skilled in the art that various changes and modifications may be made without departing from the scope of the invention as defined in the following claims.

What is claimed is:

1. A Digital Television (DTV) receiver, comprising:
   a receiving unit for receiving a transmission signal including general data and robust data and converting the transmission signal into a base-band signal;
   an equalizing unit for determining a symbol level of the transmission signal;
   a trellis decoding unit for performing trellis decoding on a symbol of the determined level;
   a nonsystematic Reed Solomon (NRS) decoding unit for performing NRS decoding on the trellis-decoded robust data and for performing robust data error correction on the trellis-decoded robust data; and
   a restoring unit for restoring a digital video data stream with respect to the trellis-decoded general data and the NRS-decoded robust data.

2. The DTV receiver as recited in claim 1, wherein the restoring unit includes:
   a packet formatting unit for reconstructing a packet with respect to the robust data;
   a data deinterleaving unit for deinterleaving the reconstructed robust data;
   an RS decoding unit for correcting a forward error with respect to the general data and the robust data; and
   a data derandomizing unit for derandomizing the RS-decoded data.

3. The DTV receiver as recited in claim 2, wherein the restoring unit further includes
   a controller for computing a delay time that is the delay between the robust data and the general data, the delay time including delay caused by NRS decoding and packet reconstruction, and
   the data derandomizing unit performs derandomization in consideration of the delay time.

4. The DTV receiver as recited in claim 1, wherein the NRS decoding is performed before parity bytes, which are added to the robust data to secure backwards compatibility, are removed.

5. A Digital Television (DTV) receiving method, comprising:
   receiving a transmission signal including general data and robust data and converting the transmission signal into a base-band signal;
   determining a symbol level of the transmission signal;
   performing trellis decoding on a symbol of the determined level;
   performing nonsystematic Reed Solomon (NRS) decoding on the trellis-decoded robust data and performing robust data error correction on the trellis-decoded robust data; and restoring a digital video data stream with respect to the trellis-decoded general data and the NRS-decoded robust data.

6. The method as recited in claim 5, wherein restoring the digital video data stream comprises:
reconstructing a packet with respect to the robust data;
deinterleaving the reconstructed robust data;
performing forward error correction with respect to the general data and the robust data; and
derandomizing the RS-decoded data.

7. The method as recited in claim 6, wherein restoring the digital video data stream further comprises:
computing delay time for NRS decoding and packet reconstruction with respect to the robust data, and
derandomization is performed in consideration of the delay time in the derandomizing of the RS-decoded data.

* * * * *